(12) United States Patent  
Chen (10) Patent No.: US 12,348,361 B2
(45) Date of Patent: Jul. 1, 2025

(54) METHOD AND APPARATUS FOR FAILURE DETECTION AND PE DEVICE

(71) Applicant: New H3C Technologies Co., Ltd., Hangzhou (CN)

(72) Inventor: Jian Chen, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 185 days.

(21) Appl. No.: 18/000,742

(22) PCT Filed: Jun. 30, 2020

(86) PCT No.: PCT/CN2020/099258
§ 371 (c)(1),
(2) Date: Dec. 5, 2022

(87) PCT Pub. No.: WO2022/000264
PCT Pub. Date: Jan. 6, 2022

(65) Prior Publication Data
US 2023/0216780 A1 Jul. 6, 2023

(51) Int. Cl.
*H04L 41/0668* (2022.01)
*H04L 45/00* (2022.01)
(Continued)

(52) U.S. Cl.
CPC ......... *H04L 41/0668* (2013.01); *H04L 45/00* (2013.01); *H04L 45/22* (2013.01);
(Continued)

(58) Field of Classification Search
None
See application file for complete search history.

(56) References Cited

U.S. PATENT DOCUMENTS

2008/0285466 A1 11/2008 Salam
2011/0286324 A1 11/2011 Bellagamba
(Continued)

FOREIGN PATENT DOCUMENTS

CN 101425942 A 5/2009
CN 101902353 A 12/2010
(Continued)

OTHER PUBLICATIONS

Ali et al., "Bidirectional Forwarding Detection (BFD) for Segment Routing Policies for Traffic Engineering", May 15, 2020.
(Continued)

*Primary Examiner* — Christine T Duong
(74) *Attorney, Agent, or Firm* — McDonnell Boehnen Hulbert & Berghoff LLP (57) ABSTRACT

The present disclosure provides a method and apparatus for failure detection and a PE device, and in particular, relates to the field of communication technology. The present disclosure is applied to the first PE device in EVPN. The first PE device is connected to the second PE device through the SRv6 PW tunnel. The method includes: generating an SRv6 packet, wherein a first indicator included in the SRv6 packets indicates that an inner packet of the SRv6 packet is a BFD packet; sending the SRv6 packet to the second PE device, so that when the second PE device is a tail node, the second PE device establishes a BFD session with a head node based on the BFD packet, and when the head node detects that the PW tunnel between the head node and the tail node fails through the BFD session, the head node switches a service flow to a backup tunnel; or, when the second PE device is a splice device, the second PE device transparently transmits the BFD packet to the tail node, so that the BFD session is established between the head node and the tail node, and when the head node detects that the PW tunnel
(Continued)

between the head node and the tail node fails through the BFD session, the head node switches the service flow to the backup tunnel. This may reduce the transmission delay of the service flow.

8 Claims, 6 Drawing Sheets

(51) Int. Cl.
    *H04L 45/28*     (2022.01)
    *H04L 45/50*     (2022.01)

(52) U.S. Cl.
    CPC .............. *H04L 45/28* (2013.01); *H04L 45/34* (2013.01); *H04L 45/50* (2013.01)

(56) References Cited

U.S. PATENT DOCUMENTS

| | | |
|---|---|---|
| 2018/0183654 A1 | 6/2018 | Patel |
| 2019/0089627 A1 | 3/2019 | Mirsky |
| 2020/0076724 A1* | 3/2020 | Nainar ................ H04L 47/28 |
| 2020/0296025 A1* | 9/2020 | Wang ................ H04L 12/4633 |

FOREIGN PATENT DOCUMENTS

| | | |
|---|---|---|
| CN | 102055619 A | 5/2011 |
| CN | 102170390 A | 8/2011 |
| CN | 103812745 A | 5/2014 |
| CN | 103843293 A | 6/2014 |
| CN | 104468208 A | 3/2015 |
| CN | 108809759 A | 11/2018 |
| CN | 109474495 A | 3/2019 |
| CN | 110266592 A | 9/2019 |
| JP | 2018501738 A | 1/2018 |
| WO | 2009056034 A1 | 5/2009 |
| WO | 2019076295 A1 | 4/2019 |

OTHER PUBLICATIONS

Liu et al., "Encapsulation of BFD for SRv6 Policy", China Mobile, Oct. 21, 2022.

Liu et al., "Encapsulation of BFD for SRv6 Policy", IETF-115, Nov. 4, 2022.

* cited by examiner

METHOD AND APPARATUS FOR FAILURE DETECTION AND PE DEVICE

PRIORITY

The present disclosure is a U.S. National Phase Application under 35 U.S.C. § 371 of International Application No. PCT/CN2020/099258 filed Jun. 30, 2020, and entitled "Method and Apparatus for Failure Detection and PE Device", which is incorporated herein by reference in its entirety.

TECHNICAL FIELD

The present disclosure relates to the field of communication technology, and in particular, to a method and apparatus for failure detection and a PE device.

BACKGROUND

Figure 1:
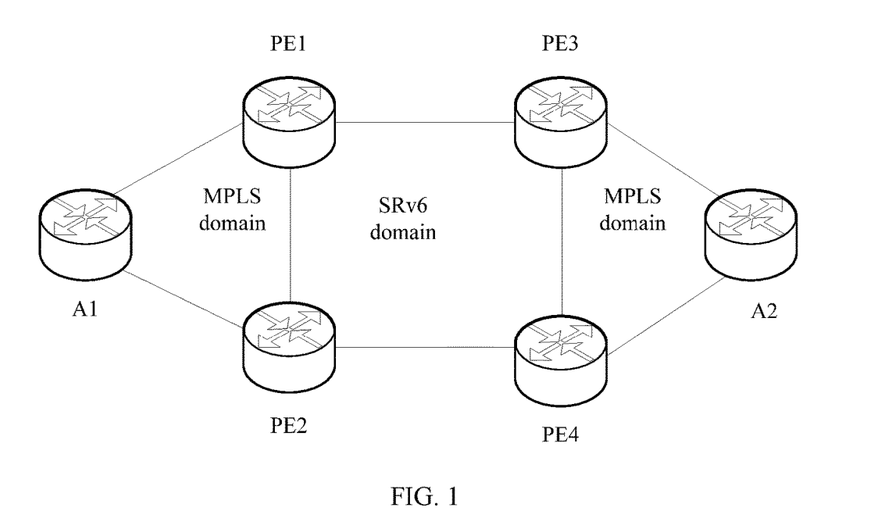
FIG. 1 is an exemplary schematic diagram of a network architecture of an EVPN provided in background.

With the evolution of Ethernet Virtual Private Network (EVPN), the state of coexistence of Label Distribution Protocol (LDP) and Internet Protocol version 6 Segment Routing (SRv6) in EVPN has emerged. For example, as shown in FIG. 1, A1 accesses a service Provider Edge (PE) 1 and a PE2, and the PE1 is connected to the PE2 and a PE3. A2 accesses the PE3 and a PE4, and the PE3 is connected to the PE1 and the PE4. The PE2 is connected to the PE4. The A1, the PE1 and the PE2 form a Multi-protocol Label Switching (MPLS) domain. The A1 communicates with the PE1 through MPLS Pseudo Wire (PW), and the A1 communicates with the PE2 through MPLS Pseudo Wire. The PE1, the PE2, the PE3 and the PE4 form an SRv6 domain. The PE1 communicates with the PE3 through SRv6 PW, and the PE2 communicates with the PE4 through SRv6 PW. The A2, the PE3 and the PE4 form an MPLS domain. The A2 communicates with the PE3 through MPLS PW, and the A2 communicates with the PE4 through MPLS PW.

There are multiple communication links between the A1 and the A2. A1-PE1-PE3-A2 is set as a main link, and A1-PE2-PE4-A2 is set as a backup link of the main link. The PE1 detects whether a link failure between the PE1 and the PE3 occurs by a failure detection mechanism of SRv6. For example, the PE1 may detect whether the link failure occurs by sending a ping command to the PE3. If the PE1 does not receive a response message from the PE3 within a specified time period, the PE1 determines that the link failure occurs. If the PE1 detects that the link failure occurs, the PE1 sends a Transmission Control Protocol (TCP) message to the A1 based on LDP, to notify the A1 that the link failure between the PE1 and the PE3 occurs. After receiving the TCP message, the A1 senses the failure of the main link formed by A1-PE1-PE3-A2, and then switches a service flow to the backup link.

However, when the PE1 determines that the link between the PE1 and the PE3 fails, a transmission delay of the service flow has been generated. At this time, the PE1 still needs to create a TCP message and send it to the A1. This process will further increase the transmission delay of the service flow, so that the A1 cannot switch the service flow carried by the failed link to other backup links in time, further increasing the transmission delay.

SUMMARY

The present disclosure provides a method and apparatus for failure detection, and a PE device, so as to realize timely switching a service flow carried by a failed link to other backup links, thereby avoiding long transmission delay of the service flow. The following specific technical solutions are provided.

In a first aspect, the present disclosure provides a method for failure detection. The method is applied to a first service provider edge (PE) device in an Ethernet virtual private network (EVPN), the first PE device is connected to a second PE device through an Internet protocol version 6 segment routing (SRv6) pseudo wire (PW) tunnel, and the method includes:

generating an SRv6 packet; wherein, the SRv6 packet includes a first indicator, which indicates that an inner packet of the SRv6 packet is a bidirectional forwarding detection (BFD) packet;

sending the SRv6 packet to the second PE device, so that when the second PE device is a tail node, the second PE device establishes a BFD session with a head node based on the BFD packet, and when the head node detects that the PW tunnel between the head node and the tail node fails through the BFD session, the head node switches a service flow to a backup tunnel; or, when the second PE device is a splice device, the second PE device transparently transmits the BFD packet to the tail node, so that the BFD session is established between the head node and the tail node, and when the head node detects that the PW tunnel between the head node and the tail node fails through the BFD session, the head node switches the service flow to the backup tunnel; and wherein, each of the head node and the tail node is a node connected to a custom edge (CE) device.

In an example, the head node is a first multi-protocol label switching (MPLS) device, and the first PE device is connected to the first MPLS device through a first MPLS pseudo wire (PW) tunnel;

before generating the SRv6 packet, the method includes:
receiving a first MPLS packet sent by the first MPLS device;

decapsulating the first MPLS packet, and reading a PW associated control channel (ACH) field in the first MPLS packet;

if a value of the PW ACH field is a BFD control word, extracting the BFD packet following the PW ACH field; wherein, the BFD control word indicates that an inner packet included in the first MPLS packet is the BFD packet;

generating the SRv6 packet includes:
encapsulating the BFD packet to obtain the SRv6 packet; wherein, a value of an inner routing header field of the SRv6 packet is the first indicator.

In an example, after extracting the BFD packet following the PW ACH field, the method further includes:

determining whether configuration information of the first PE device includes splice configuration information, which indicates that the first PE device is to implement intercommunication between an MPLS network and an SRv6 network;

if the configuration information of the first PE device includes the splice configuration information, performing the operation of encapsulating the BFD packet to obtain the SRv6 packet.

In a second aspect, the present disclosure provides a method for failure detection. The method is applied to a second service provider edge (PE) device in an Ethernet virtual private network (EVPN), the second PE device is connected to a first PE device through a first Internet protocol version 6 segment routing (SRv6) pseudo wire (PW) tunnel, and the method includes:

receiving an SRv6 packet sent by the first PE device; wherein, the SRv6 packet includes a first indicator, which indicates that an inner packet of the SRv6 packet is a bidirectional forwarding detection (BFD) packet;

establishing a BFD session with a head node based on the BFD packet when the second PE device is a tail node, so that when the head node detects that the PW tunnel between the head node and the tail node fails through the BFD session, the head node switches a service flow to a backup tunnel;

transparently transmitting the BFD packet to the tail node when the second PE device is a splice device, so that the BFD session is established between the head node and the tail node, and when the head node detects that the PW tunnel between the head node and the tail node fails through the BFD session, the head node switches the service flow to the backup tunnel;

wherein, each of the head node and the tail node is a node connected to a custom edge (CE) device.

In an example, the tail node is a second multi-protocol label switching (MPLS) device, and the second MPLS device is connected to the second PE device;

before transparently transmitting the BFD packet to the tail node when the second PE device is not the tail node, the method further includes:

reading an inner routing header field of the SRv6 packet;

if a value of the inner routing header field is the first indicator, extracting the BFD packet from the SRv6 packet;

encapsulating the BFD packet to obtain a second MPLS packet; wherein, a value of a PW associated control channel (ACH) field of the second MPLS packet is a BFD control word;

transparently transmitting the BFD packet to the tail node includes:

sending the second MPLS packet to the second MPLS device.

In an example, after receiving the SRv6 packet sent by the first PE device, the method further includes:

determining whether configuration information of the second PE device includes splice configuration information, which indicates that the second PE device is to implement intercommunication between an SRv6 network and an MPLS network;

if the configuration information of the second PE device includes the splice configuration information, determining that the second PE device is the splice device; and if the configuration information of the second PE device does not include the splice configuration information, determining that the second PE device is the tail node.

In a third aspect, the present disclosure provides an apparatus for failure detection. The apparatus is applied to a first service provider edge (PE) device in an Ethernet virtual private network (EVPN), the first PE device is connected to a second PE device through an Internet protocol version 6 segment routing (SRv6) pseudo wire (PW) tunnel, and the apparatus includes:

a generation module, to generate an SRv6 packet; wherein, the SRv6 packet includes a first indicator, which indicates that an inner packet of the SRv6 packet is a bidirectional forwarding detection (BFD) packet;

a sending module, to send the SRv6 packet to the second PE device, so that when the second PE device is a tail node, the second PE device establishes a BFD session with a head node based on the BFD packet, and when the head node detects that the PW tunnel between the head node and the tail node fails through the BFD session, the head node switches a service flow to a backup tunnel; or, when the second PE device is a splice device, the second PE device transparently transmits the BFD packet to the tail node, so that the BFD session is established between the head node and the tail node, and when the head node detects that the PW tunnel between the head node and the tail node fails through the BFD session, the head node switches the service flow to the backup tunnel;

wherein, each of the head node and the tail node is a node connected to a custom edge (CE) device.

In an example, the head node is a first multi-protocol label switching (MPLS) device, and the first PE device is connected to the first MPLS device through a first MPLS pseudo wire (PW) tunnel;

the apparatus further includes:

a receiving module, to receive a first MPLS packet sent by the first MPLS device before the generation module generates the SRv6 packet;

a decapsulation module, to decapsulate the first MPLS packet, and read a PW associated control channel (ACH) field in the first MPLS packet; and an extracting module, to extract the BFD packet following the PW ACH field if a value of the PW ACH field is a BFD control word; wherein, the BFD control word indicates that an inner packet included in the first MPLS packet is the BFD packet;

the generation module is further to encapsulate the BFD packet to obtain the SRv6 packet; wherein, a value of an inner routing header field of the SRv6 packet is the first indicator.

In an example, the apparatus further includes:

a determination module, to determine whether configuration information of the first PE device includes splice configuration information, which indicates that the first PE device is to implement intercommunication between an MPLS network and an SRv6 network; and if the configuration information of the first PE device includes the splice configuration information, trigger the generation module to encapsulate the BFD packet to obtain the SRv6 packet.

In a fourth aspect, the present disclosure provides an apparatus for failure detection. The apparatus is applied to a second service provider edge (PE) device in an Ethernet virtual private network (EVPN), the second PE device is connected to a first PE device through a first Internet protocol version 6 segment routing (SRv6) pseudo wire (PW) tunnel, and the apparatus includes:

a receiving module, to receive an SRv6 packet sent by the first PE device; wherein, the SRv6 packet includes a first indicator, which indicates that an inner packet of the SRv6 packet is a bidirectional forwarding detection (BFD) packet;

an establishing module, to establish a BFD session between the second PE device and a head node based on the BFD packet when the second PE device is a tail node, so that when the head node detects that the PW tunnel between the head node and the tail node fails through the BFD session, the head node switches a service flow to a backup tunnel;

a transparently transmitting module, to transparently transmit the BFD packet to the tail node when the second PE device is a splice device, so that the BFD session is established between the head node and the tail node, and when the head node detects that the PW tunnel between the head node and the tail node fails through the BFD session, the head node switches the service flow to the backup tunnel;

wherein, each of the head node and the tail node is a node connected to a custom edge (CE) device.

In an example, the tail node is a second multi-protocol label switching (MPLS) device, and the second MPLS device is connected to the second PE device;

the apparatus further includes:

a reading module, to read an inner routing header field of the SRv6 packet;

an extracting module, to extract the BFD packet from the SRv6 packet when a value of the inner routing header field is the first indicator; and an encapsulation module, to encapsulate the BFD packet to obtain a second MPLS packet; wherein, a value of a PW associated control channel (ACH) field of the second MPLS packet is a BFD control word;

the transparently transmitting module is further to send the second MPLS packet to the second MPLS device.

In an example, the apparatus further includes a determination module to:

determine whether configuration information of the second PE device includes splice configuration information, which indicates that the second PE device is to implement intercommunication between an SRv6 network and an MPLS network;

if the configuration information of the second PE device includes the splice configuration information, determine that the second PE device is the splice device;

if the configuration information of the second PE device does not include the splice configuration information, determine that the second PE device is the tail node.

In a fifth aspect, the present disclosure further provides a PE device, including a processor, a communication interface, a memory and a communication bus; wherein, the processor, the communication interface and the memory communicate with each other through the communication bus;

the memory is to store a computer program;

the processor is to, when executing the computer program stored in the memory, perform any of the above methods for failure detection.

In a sixth aspect, the present disclosure further provides a computer readable storage medium having stored therein a computer program. The computer program is executed by a processor, so as to cause the processor to perform any of the methods for failure detection.

In a seventh aspect, the present disclosure also provides a computer program product including instructions which, when executed by a computer, causes the computer to perform any of the methods for failure detection.

In the method and apparatus for failure detection and the PE device provided by the present disclosure, the first PE device may generate an SRv6 packet, and indicate that the inner packet of the SRv6 packet is a BFD packet through the first indicator included in the SRv6 packet. After receiving the SRv6 packet, the second PE device may extract the BFD packet from the SRv6 packet based on the first indicator, and implement the failure detection by BFD in the SRv6 domain. In addition, if the second PE device is a splice device, the second PE device may transparently transmit the BFD packet to the tail node, so that a BFD session may be established between the head node and the tail node across network domains. Since the BFD session may provide failure detection in milliseconds, it can be detected in time whether the PW tunnel between the head node and the tail node fails, through the BFD session between the head node and the tail node. Therefore, in the case where a failure is detected, the service flow is switched to the backup tunnel in time, reducing the transmission delay of the service flow.

Of course, in any of the products or methods implementing the present disclosure, it is not necessary to achieve all of the advantages described above at the same time.

BRIEF DESCRIPTION OF THE DRAWINGS

In order to more clearly describe the technical solutions of the examples of the present disclosure and the prior art, drawings that need to be used in examples and the prior art will be briefly described below. Obviously, the drawings described below are only some of examples of the present disclosure; those skilled in the art may also obtain other drawings based on these drawings without any creative efforts.

DETAILED DESCRIPTION

In order to make the objective, technical solutions and advantages of the present disclosure clearer and more understandable, the present disclosure will be described in more detail below with reference to the drawings and examples. Obviously, the described examples are only some, and not all, of the examples of the present disclosure. All other examples obtained based on the examples of the present disclosure by those skilled in the art without any creative efforts fall into the scope of protection of the present disclosure.

Figure 2:
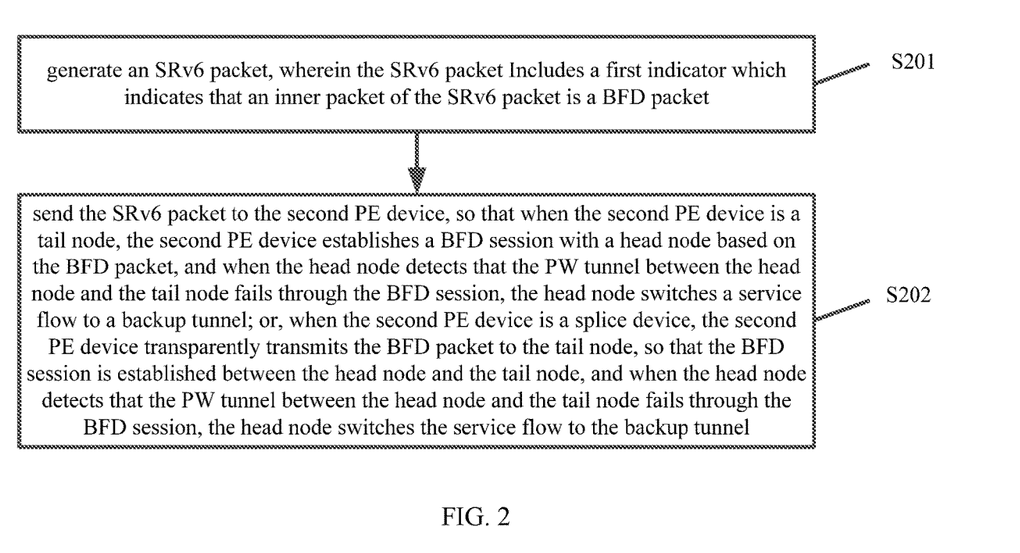
FIG. 2 is a flow chart of a method for failure detection according to an example of the present disclosure.

An example of the present disclosure provides a method for failure detection. The method is applied to a first PE device in an EVPN. The first PE device is connected to a second PE device through an SRv6 PW tunnel. As shown in FIG. 2, the method includes the following blocks.

At block S201, an SRv6 packet is generated; wherein, the SRv6 packet includes a first indicator, which indicates that an inner packet of the SRv6 packet is a Bidirectional Forwarding Detection (BFD) packet.

At block S202, the SRv6 packet is sent to the second PE device, so that when the second PE device is a tail node, the second PE device establishes a BFD session with a head node based on the BFD packet, and when the head node detects that the PW tunnel between the head node and the tail node fails through the BFD session, the head node switches a service flow to a backup tunnel; or, when the second PE device is a splice device, the second PE device transparently transmits the BFD packet to the tail node, so that the BFD session is established between the head node and the tail node, and when the head node detects that the PW tunnel between the head node and the tail node fails through the BFD session, the head node switches the service flow to the backup tunnel.

The splice device refers to a device connected to the SRv6 domain and the MPLS domain. If the MPLS device connected with the second PE device is a tail node, the second PE device transparently transmits the BFD packet to the tail node. If the MPLS device connected with the second PE device is not the tail node, the second PE device transparently transmits the BFD packet to the MPLS device, and the MPLS device forwards the BFD packet in the MPLS domain until the BFD packet is transmitted to the tail node in the MPLS domain.

Each of the head node and the tail node is a node connected to a Custom Edge (CE) device. The head node is the first node in the PW tunnel for carrying the service flow, and the tail node is the last node in the PW tunnel for carrying the service flow.

In an example, the PW tunnel and the backup tunnel between the head node and the tail node are the main tunnel and the backup tunnel. In the case where the PW tunnel does not fail, the PW tunnel carries the service flow between the head node and the tail node, and the backup tunnel does not carry the service flow. In the case where the PW tunnel fails, the service flow carried by the PW tunnel is switched to the backup tunnel.

In another example, the PW tunnel and the backup tunnel between the head node and the tail node are equivalent to each other. In the case where the two tunnels do not fail, the two tunnels respectively carry a part of the service flow between the head node and the tail node. When one of the two tunnels fails, the service flow carried by the failed tunnel is switched to the other tunnel.

In the method for failure detection provided in the example of the present disclosure, the first PE device may generate the SRv6 packet, and indicate that the inner packet of the SRv6 packet is the BFD packet through the first indicator included in the SRv6 packet. After receiving the SRv6 packet, the second PE device may extract the BFD packet from the SRv6 packet based on the first indicator, achieving the detection of the failure by BFD in the SRv6 domain. In addition, if the second PE device is a splice device, the second PE device may transparently transmit the BFD packet to the tail node, so that a BFD session may be established between the head node and the tail node across network domains. Since the BFD session may provide failure detection in order of milliseconds, it can be detected in time, through the BFD session between the head node and the tail node, whether the PW tunnel between the head node and the tail node fails. Therefore, in the case where the failure is detected, the service flow is switched to the backup tunnel in time, reducing the transmission delay of the service flow.

In an example of the present disclosure, the above-mentioned head node is a first MPLS device, and the first PE device is connected to the first MPLS device through a first MPLS PW tunnel. The first MPLS device is a PE device in the MPLS domain. Before the block S201 of generating the SRv6 packet, the method further includes the following operations.

At operation 1, the first PE device receives a first MPLS packet sent by the first MPLS device.

At operation 2, the first PE device decapsulates the first MPLS packet, and reads a PW Associated Control Channel (ACH) field in the first MPLS packet.

At operation 3, if a value of the PW ACH field is a BFD control word, the first PE device extracts the BFD packet following the PW ACH field.

The BFD control word indicates that the inner packet included in the first MPLS packet is the BFD packet.

In an example, after extracting the BFD packet, the first PE device determines whether configuration information of the first PE device includes splice configuration information, which indicates that the first PE device is to implement the intercommunication of the MPLS network and the SRv6 network. If the configuration information of the first PE device includes the splice configuration information, the above S201 is performed. If the configuration information of the first PE device does not include the splice configuration information, the first PE device establishes the BFD session with the first MPLS device based on the BFD packet.

On the basis that the first PE device extracts the BFD packet in the first MPLS packet, the above S201 may specifically include:

encapsulating the BFD packet to obtain the SRv6 packet.
A value of an inner routing header field of the SRv6 packet is the first indicator.

In the process of encapsulating the BFD packet by the first PE device, in addition to the basic encapsulation, the value of the inner routing header field (next header) in the header of the SRv6 packet needs to be set as the first indicator.

Figure 3A:
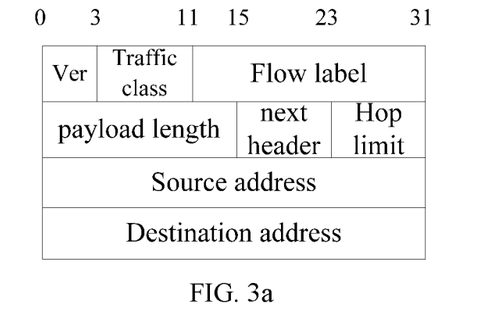
FIG. 3a is an exemplary schematic diagram of an SRv6 header according to an example of the present disclosure.

For example, as shown in FIG. 3a, if there is only one next header field in the header of the SRv6 packet, the value of the next header field is set as the first indicator. The header of the SRv6 packet is the ipv6 basic header.

In FIG. 3a, Ver is Version (version number), indicating a version of the protocol whose value is 6.

Traffic class indicates Quality of Service (Qos) of a packet. Flow label indicates packets in the same data flow. Payload length indicates the number of bytes following the Ipv6 basic header. Next header indicates a type of a next header following the IPv6 basic header. Hop limit indicates that every time a packet is forwarded, a hop count is reduced by 1, and when the value of this field is 0, the packet will be discarded. Source address indicates a source address of the packet. Destination address indicates a destination address of the packet.

Figure 3B:
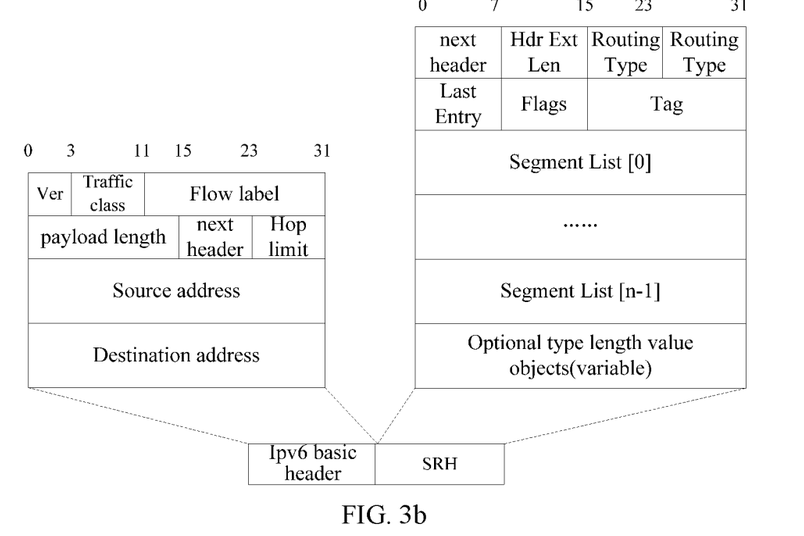
FIG. 3b is an exemplary schematic diagram of an SRv6 header according to an example of the present disclosure.

As another example, as shown in FIG. 3b, if there are multiple next header fields in the header of the SRv6 packet, the value of the innermost next header field is set as the first indicator.

In FIG. 3b, the header of the SRv6 packet includes an Ipv6 basic header and a routing extension header. The routing extension header is an Ipv6 Segment Routing Header (SRH). In FIG. 3b, the innermost next header field is a next header field included in the SRH.

The SRH includes Next Header, Hdr Ext Len (extension header length), Routing type, Segments Left, Last Entry, Flags, Tag, Segment List, Optional type length value objects (variable). Next Header indicates a type of the next header. Hdr Ext Len (extension header length) indicates the length of SRH in 8-byte units. The length does not include the first 8 bytes of SRH, and the length occupied by the Hdr Ext Len field is 8 bits. Routing type indicates a type of routing extension header and has a value of 4, which indicates that the type of the routing extension header is SRH. The length occupied by the Routing Type field is 8 bits. Segment left indicates a serial number of next segment identifier (SID) that needs to be viewed, and has an initial value of n−1 (n represents the number of SIDs in the routing extension header). The value of Segment left is decreased by 1 each time one node is passed. The length occupied by the Segment left field is 8 bits. Last Entry indicates a serial number of the last SID of a packet forwarding path in the SRH and has a value of 0. The length occupied by the Last Entry field is 8 bits. Flags indicates flags information. The length occupied by the Flags field is 8 bits. Tag indicates a group of packets with the same characteristics. The length occupied by the Tag field is 168 bits. Segment List indicates a list of SIDs. The SIDs in the list of SIDs are arranged in the order of the nodes in the packet forwarding path from far to near, that is, Segment List [0] indicates the last SID in the communication link, Segment List [1] indicates the penultimate SID in the packet forwarding path, and so on. The variable in Optional type length value object (variable) indicates that a value of this field is a variable.

In the example of the present disclosure, the value of the innermost next header field of the SRv6 packet may be set to 253, which is a reserved type with an experimental nature specified in the protocol. In the example of the present disclosure, the 253 type may be used as the first indicator to indicate that the inner packet of the SRv6 packet is the BFD packet.

Figure 4:
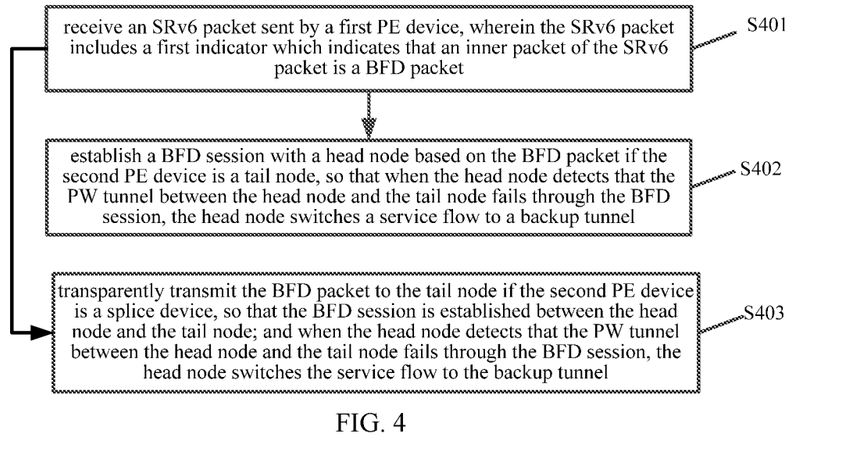
FIG. 4 is another flow chart of a method for failure detection according to an example of the present disclosure.

Corresponding to the method in FIG. 2, an example of the present disclosure further provides a method for failure detection. The method is applied to the second PE device in the EVPN. The second PE device is connected to the first PE device through the first SRv6 PW tunnel. As shown in FIG. 4, the method includes the following blocks.

At block S401, an SRv6 packet sent by the first PE device is received; wherein, the SRv6 packet includes a first indicator, and the first indicator indicates that an inner packet of the SRv6 packet is a BFD packet.

At block S402, if the second PE device is a tail node, the second PE device establishes a BFD session with a head node based on the BFD packet, so that when the head node detects that the PW tunnel between the head node and the tail node fails through the BFD session, the head node switches a service flow to the backup tunnel.

At block S403, if the second PE device is a splice device, the second PE device transparently transmits the BFD packet to the tail node, so that a BFD session is established between the head node and the tail node; when the head node detects that the PW tunnel between the head node and the tail node fails through the BFD session, the head node switches the service flow to the backup tunnel.

Each of the head node and the tail node is a node connected to a CE device.

The description of the head node, the tail node and the backup tunnel may refer to the related description in S202 above.

In the method for failure detection provided in the example of the present disclosure, after receiving the SRv6 packet, the second PE device may determine that the inner packet of the SRv6 packet is the BFD packet by the first indicator. When the second PE device is the tail node, the second PE device establishes the BFD session with the head node. When the second PE device is the splice device, the second PE device transparently transmits the BFD packet to the tail node, so that the BFD session is established between the head node and the tail node. Since the BFD session may provide failure detection in milliseconds, it can be detected in time, through the BFD session between the head node and the tail node, whether the PW tunnel between the head node and the tail node fails. Therefore, when a failure is detected, the service flow is switched to the backup tunnel in time, reducing the transmission delay of the service flow.

In an example, after receiving the SRv6 packet sent by the first PE device, the second PE device may determine whether configuration information of the second PE device includes splice configuration information, which indicates that the second PE device is to implement the intercommunication between the SRv6 network and the MPLS network.

If the configuration information of the second PE device includes the splice configuration information, the second PE device determines that the second PE device is the splice device. If the configuration information of the second PE device does not include the splice configuration information, the second PE device determines that the second PE device is the tail node.

In an example of the present disclosure, the tail node is the second MPLS device, and the second MPLS device is connected to the second PE device. Before the block S403 of transparently transmitting the BFD packet to the tail node if the second PE device is not the tail node, the method further includes the following operations.

At operation A, the inner routing header field of the SRv6 packet is read.

For example, in FIG. 3a, the inner routing header field is the next header field in the IPv6 basic header. In FIG. 3b, the inner routing header field is the next header field in the SRH header.

At the operation B, if it is determined that the value of the inner routing header field is the first indicator, the BFD packet is extracted from the SRv6 packet.

In an example, the value of the first indicator is 253.

At the operation C, the BFD packet is encapsulated to obtain a second MPLS packet; wherein, the value of the PW ACH field of the second MPLS packet is the BFD control word.

Furthermore, the second PE device may send the second MPLS packet to the tail node, so that when recognizing the BFD control word, the tail node does not forward the second MPLS packet to the CE device, but processes an inner BFD packet of the second MPLS packet.

The method for failure detection provided by the example of the present disclosure will be described below in conjunction with specific scenarios.

Figure 5:
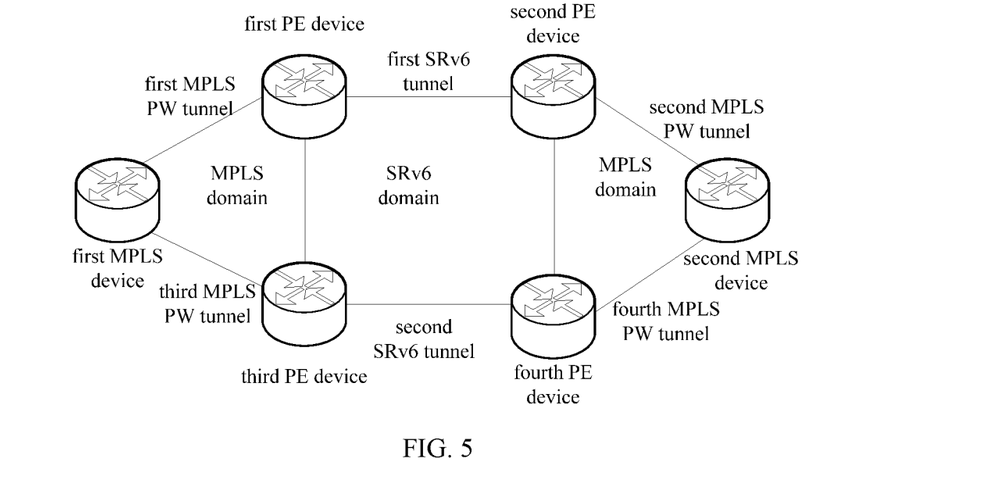
FIG. 5 is a schematic structural diagram of a network architecture of an EVPN according to an example of the present disclosure.

In scenario 1, as shown in FIG. 5, EVPN includes a first MPLS device, a first PE device, a second PE device and a second MPLS device.

The first MPLS device and the second MPLS device are both PE devices.

The first MPLS device accesses respectively the first PE device and the third PE device, and the second MPLS device accesses respectively the second PE device and the fourth PE device.

There is a first MPLS PW tunnel between the first MPLS device and the first PE device, and there is a third MPLS PW tunnel between the first MPLS device and the third PE device. The first MPLS device, the first PE device and the third PE device constitute an MPLS network, which belongs to the MPLS domain.

There is a first SRv6 PW tunnel between the first PE device and the second PE device, and there is a second SRv6 PW tunnel between the third PE device and the fourth PE device. The first PE device, the second PE device, the third PE device and fourth PE device constitute an SRv6 network, which belongs to the SRv6 domain.

There is a second MPLS PW tunnel between the second MPLS device and the second PE device, and there is a fourth MPLS PW tunnel between the second MPLS device and the fourth PE device. The second MPLS device, the second PE device and the fourth PE device constitute an MPLS network, which belongs to the MPLS domain.

In FIG. 5, there are multiple forwarding paths between the first MPLS device and the second MPLS device. Two of the forwarding paths are taken as an example for description.

Path 1 is: the first MPLS device—the first PE device (the MPLS interface—the SRv6 interface)—the second PE device (the SRv6 interface—the MPLS interface)—the second MPLS device.

Path 2 is: the first MPLS device—the third PE device (the MPLS interface—the SRv6 interface)—the fourth PE device (the SRv6 interface—the MPLS interface)—the second MPLS device.

That is, the path 1 is a tunnel 1 formed by connecting the first MPLS PW tunnel, the first SRv6 PW tunnel and the second MPLS PW tunnel. The path 2 is a tunnel 2 formed by connecting the third MPLS PW tunnel, the second SRv6 PW tunnel and the fourth MPLS PW tunnel. The tunnel 1 is equivalent to the tunnel 2, or one of the tunnel 1 and the tunnel 2 is the main tunnel, and the other tunnel is the backup tunnel.

In the scenario 1, the head node is the first MPLS device, and the tail node is the second MPLS device.

Figure 6:
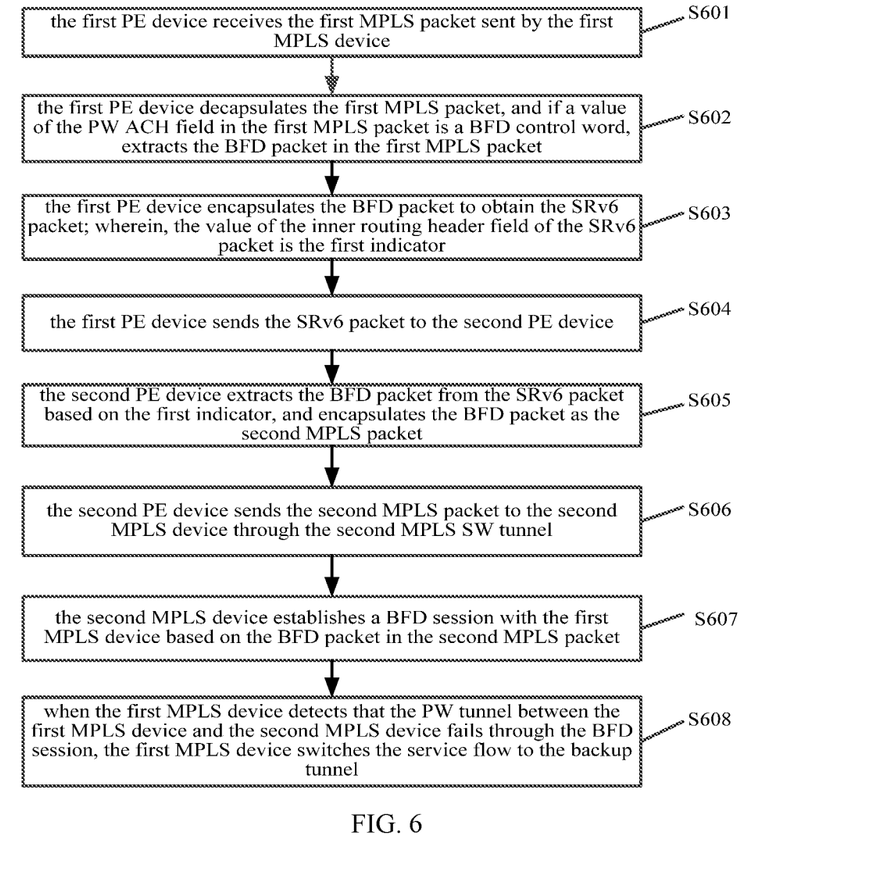
FIG. 6 is another flow chart of a method for failure detection according to an example of the present disclosure.

Based on the scenario 1, the example of the present disclosure provides a method for failure detection. As shown in FIG. 6, the method includes the following blocks.

At block S601, the first PE device receives the first MPLS packet sent by the first MPLS device.

At block S602, the first PE device decapsulates the first MPLS packet, and if the value of the PW ACH field in the first MPLS packet is the BFD control word, extracts the BFD packet in the first MPLS packet.

At block S603, the first PE device encapsulates the BFD packet to obtain the SRv6 packet; wherein, the value of the inner routing header field of the SRv6 packet is the first indicator.

The first indicator indicates that the BFD packet is encapsulated in the SRv6 packet.

In an example, the first indicator indicates that: if the PE device receiving the SRv6 packet is a splice device, the PE device encapsulates the BFD packet in the SRv6 packet as an MPLS packet, and adds the BFD control word to the MPLS packet; if the PE device receiving the SRv6 packet is the tail node, the PE device establishes the BFD session with the head node based on the BFD packet in the SRv6 packet.

The splice device refers to a PE device connected to the MPLS network and the SRv6 network. For example, both of the first PE device and the second PE device in the scenario 1 are splice devices. The tail node, such as the second MPLS device in the scenario 1, is a non-splice device and is an egress device in a certain network domain.

At block S604, the first PE device sends the SRv6 packet to the second PE device.

At block S605, the second PE device extracts the BFD packet from the SRv6 packet based on the first indicator, and encapsulates the BFD packet as the second MPLS packet.

In the process of encapsulating the BFD packet as the second MPLS packet, the value of the PW ACH field in the second MPLS packet is set as the BFD control word.

At block S606, the second PE device sends the second MPLS packet to the second MPLS device through the second MPLS SW tunnel.

At block S607, the second MPLS device establishes a BFD session with the first MPLS device based on the BFD packet in the second MPLS packet.

When the second MPLS device determines that the value of the PW ACH field of the second MPLS packet is set to the BFD control word, the second MPLS device determines that the inner packet of the second MPLS packet is not an ordinary service packet, but the BFD packet, and then establishes the BFD session with the first MPLS device based on the BFD packet.

At block S608, when the first MPLS device detects that the PW tunnel between the first MPLS device and the second MPLS device fails through the BFD session, the first MPLS device switches the service flow to the backup tunnel.

The PW tunnel between the first MPLS device and the second MPLS device is the tunnel 1, and the backup tunnel is the tunnel 2.

The BFD session is to detect whether the tunnel 1 fails. If any segment of the PW tunnel included in the tunnel 1 fails, the service flow may be switched to the tunnel 2.

In the method for failure detection provided by the example of the present disclosure, after receiving the first MPLS packet sent by the first MPLS device, the first PE device may re-encapsulate the BFD packet encapsulated in the first MPLS packet as an SRv6 packet, and send the SRv6 packet to the second PE device. The second PE device may determine that the SRv6 packet is encapsulated with the BFD packet through the first indicator in the SRv6 packet, and then transparently transmit the BFD packet encapsulated in the SRv6 packet to the second MPLS device in the MPLS network for processing, so that the BFD session is established between the first MPLS device and the second MPLS device across network domains. The BFD session can provide failure detection in milliseconds, and thus enable the failure of the tunnel between the first MPLS device and the second MPLS device to be detected more timely, thereby switching the service flow in time, and reducing the transmission delay of the service flow.

In an example of the present disclosure, in order to implement the method in FIG. 6, the first MPLS device, the first PE device and the second PE device are configured in advance.

The configuration parameters of the first MPLS device are as follows:

```
xconnect-group 1
  connection 1
    ac interface GE 0/1
    bfd enable control-word
    peer PE1_IP    pw-id 1
      backup-peer PE2_IP    pw-id 2
  return
``` wherein, xconnect-group 1 indicates that a cross-connect-group to which the PW tunnel connected with the first MPLS device belongs is a group 1; connection 1 indicates that a cross-connection of the PW tunnel connected with the first MPLS device is the connection 1; ac interface GE 0/1 indicates an AC interface on the first MPLS device; bfd enable control-word indicates BFD for enable control-word mode; bfd enable control-word is a configuration newly added in the example of the present disclosure, through which the first MPLS may send the MPLS packet encapsulated with the BFD packet to the first PE device; peer PE1_IP pw-id 1 indicates that the first MPLS device accesses PE1 through a PW tunnel with an identification of pw-id 1; and backup-peer PE2_IP pw-id 2 indicates that the first MPLS device accesses PE1 through a PW tunnel with an identification of pw-id 2.

The configuration parameters of the second MPLS device are as follows:

```
xconnect-group 1
  connection 1
    ac interface VE-L2VPN1 splicing
    bfd enable control-word
    peer A1_IP pw-id 1
  connection 2
    ac interface VE-L2VPN1.1 splicing
    evpn local-service-id 1 remote-service-id 3
  #
  interface VE-L2VPN1
  #
  interface VE-L2VPN1.1
    vlan-type dot1q vid 1000
  #
``` wherein, ac interface VE-L2VPN1 splicing indicates that an interface VE-L2VPN1 of the first PE device needs to be locally spliced; ac interface VE-L2VPN1.1 splicing indicates that an interface VE-L2VPN1.1 of the first PE device needs to be locally spliced.

The interface VE-L2VPN1 is an MPLS network interface on the first PE device, and the interface VE-L2VPN1.1 is an SRv6 network interface on the first PE device. The above two configuration parameters indicate that the interface VE-L2VPN1 needs to be spliced with the interface VE-L2VPN1.1.

peer A1_IP pw-id 1 indicates that the first PE device is connected to an A1 device through a PW tunnel with an identification of pw-id 1. In the example of the present disclosure, the A1 device is the first MPLS device.

evpn local-service-id 1 remote-service-id 2 indicates that the first PE device is spliced with the second PE device through the SRv6 network.

vlan-type dot1q vid 1000 indicates starting a dot1q termination function of the sub-interface.

Similarly, the configuration parameters of the third MPLS device are as follows:

```
xconnect-group 1
  connection 1
    ac interface VE-L2VPN1 splicing
    peer A1_IP pw-id 2
  connection 2
    ac interface VE-L2VPN1.1 splicing
    evpn local-service-id 2 remote-service-id 4
  #
  interface VE-L2VPN1
  #
  interface VE-L2VPN1.1
    vlan-type dot1q vid 1000
  #
```

Through the above configurations, both of the first PE device and the third PE device are configured as splice devices.

Figure 7:
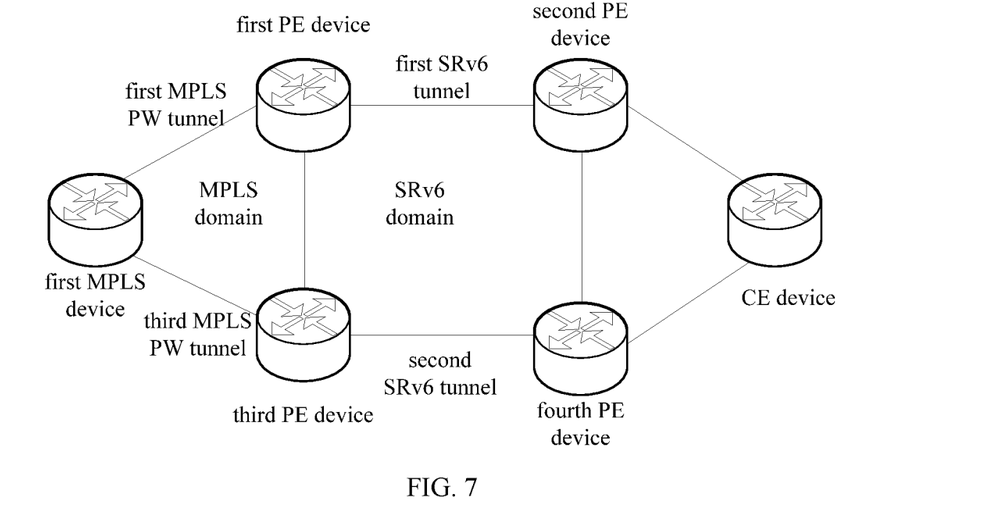
FIG. 7 is another schematic structural diagram of a network architecture of an EVPN according to an example of the present disclosure.

In the scenario 2, as shown in FIG. 7, EVPN includes a first MPLS device, a first PE device and a second PE device.

The first MPLS device may be a PE device. The first MPLS device accesses the first PE device and the third PE device, respectively.

The second PE device is connected to the CE device, and the CE device is dual-homed and accesses the second PE device and the fourth PE device.

There is a first MPLS PW tunnel between the first MPLS device and the first PE device, and there is a third MPLS PW tunnel between the first MPLS device and the third PE device. The first MPLS device, the first PE device and the third PE device constitute an MPLS network, which belongs to the MPLS domain.

There is a first SRv6 PW tunnel between the first PE device and the second PE device, and there is a second SRv6 PW tunnel between the third PE device and the fourth PE device. The first PE device, the second PE device, the third PE device and the fourth PE device constitute an SRv6 network, which belongs to the SRv6 domain.

In FIG. 7, the first MPLS device may transmit a service flow to the CE device through the PW tunnel between the first MPLS device and the second PE device, and may also transmit the service flow to the CE device through the PW tunnel between the first MPLS device and the fourth PE device. The two tunnels are equivalent to each other, or one of the two tunnels is the main tunnel and the other tunnel is the backup tunnel.

In the scenario 2, the first MPLS device is a head node, and the second PE device is a tail node.

Figure 8:
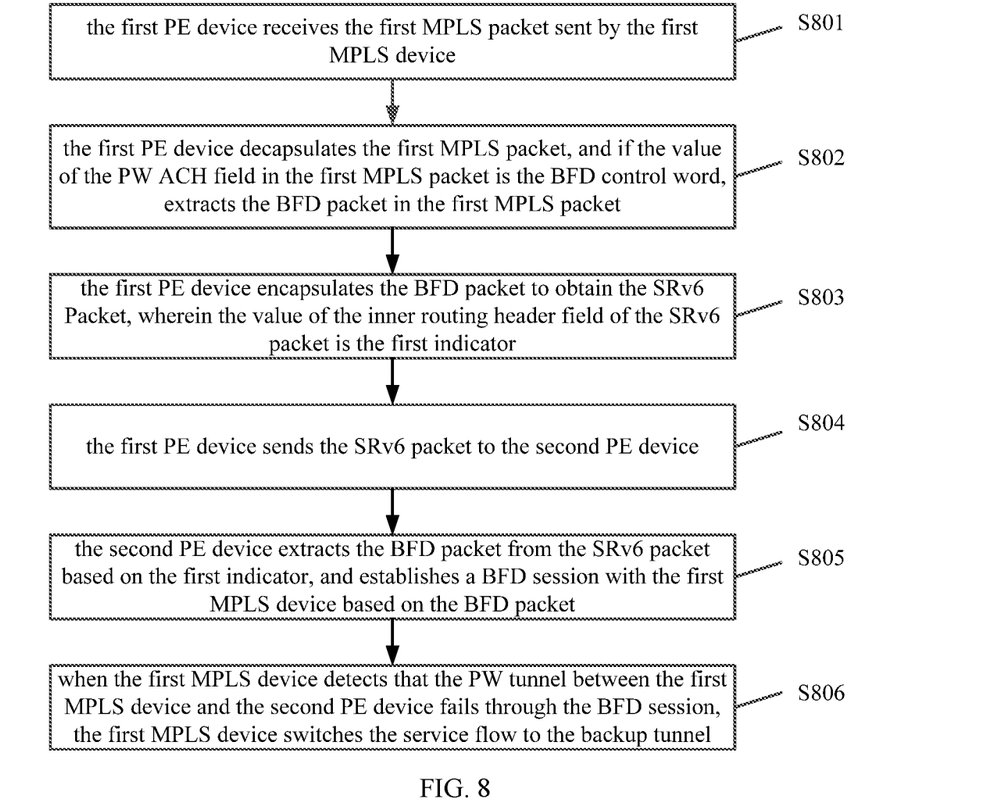
FIG. 8 is another flow chart of a method for failure detection according to an example of the present disclosure.

Based on the scenario 2, the example of the present disclosure provides a method for failure detection. As shown in FIG. 8, the method includes blocks S801-S860.

The blocks S801-S804 are the same as the blocks S601-S604, and the description thereof may refer to the related description in the blocks S601-S604.

After the block S804 of sending the SRv6 packet to the second PE device by the first PE device, the blocks S805-S806 are performed.

At block S805, the second PE device extracts the BFD packet from the SRv6 packet based on the first indicator, and establishes a BFD session with the first MPLS device based on the BFD packet.

At block S806, when the first MPLS device detects that the PW tunnel between the first MPLS device and the second PE device fails through the BFD session, the first MPLS device switches the service flow to the backup tunnel.

In the method for failure detection provided by the example of the present disclosure, after receiving the first MPLS packet sent by the first MPLS device, the first PE device may re-encapsulate the BFD packet encapsulated in the first MPLS packet as an SRv6 packet, and send the SRv6 packet to the second PE device. The second PE device may determine that the SRv6 packet carries the BFD packet through the first indicator in the SRv6 packet. Then, the second PE device processes the BFD packet encapsulated in the SRv6 packet, so that a BFD session is established between the first MPLS device and the second PE device across network domains. The BFD session may provide failure detection in milliseconds, and thus enable the failure of the tunnel between the first MPLS device and the second PE device to be detected more timely, thereby switching the service flow in time, and reducing the transmission delay of the service flow.

Figure 9:
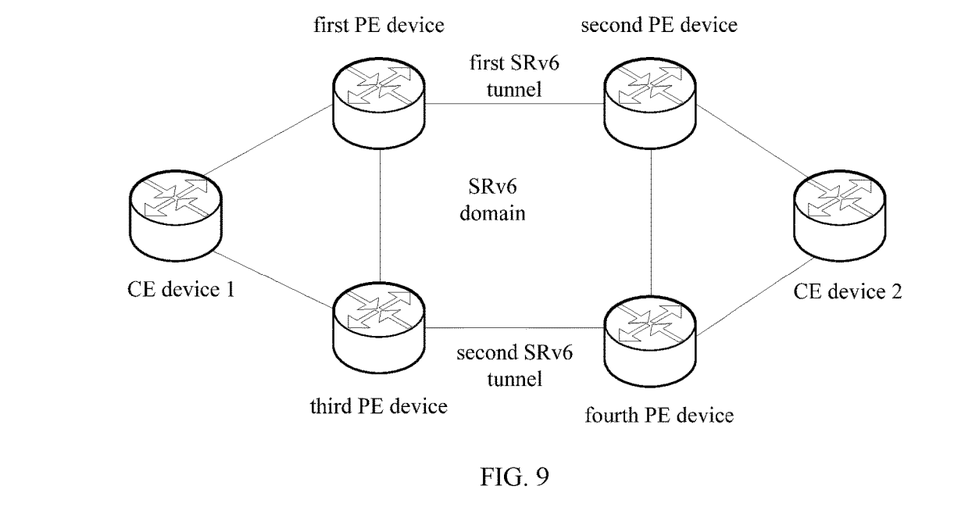
FIG. 9 is another schematic structural diagram of a network architecture of an EVPN according to an example of the present disclosure.

In the scenario 3, as shown in FIG. 9, CE device 1 is dual-homed and accesses the first PE device and the third PE device, and CE device 2 is dual-homed and accesses the second PE device and the fourth PE device.

There is a first SRv6 PW tunnel between the first PE device and the second PE device, and there is a second SRv6 PW tunnel between the third PE device and the fourth PE device. The first PE device, the second PE device, the third PE device and the fourth PE device constitute an SRv6 network, which belongs to the SRv6 domain.

The first SRv6 PW tunnel is equivalent to the second SRv6 PW tunnel, or one of the two tunnels is the main tunnel and the other tunnel is the backup tunnel. When the first SRv6 PW tunnel fails, the service flow carried by the first SRv6 PW tunnel may be switched to the second SRv6 PW tunnel.

In the scenario 3, the head node is the first PE device, and the tail node is the second PE device.

Figure 10:
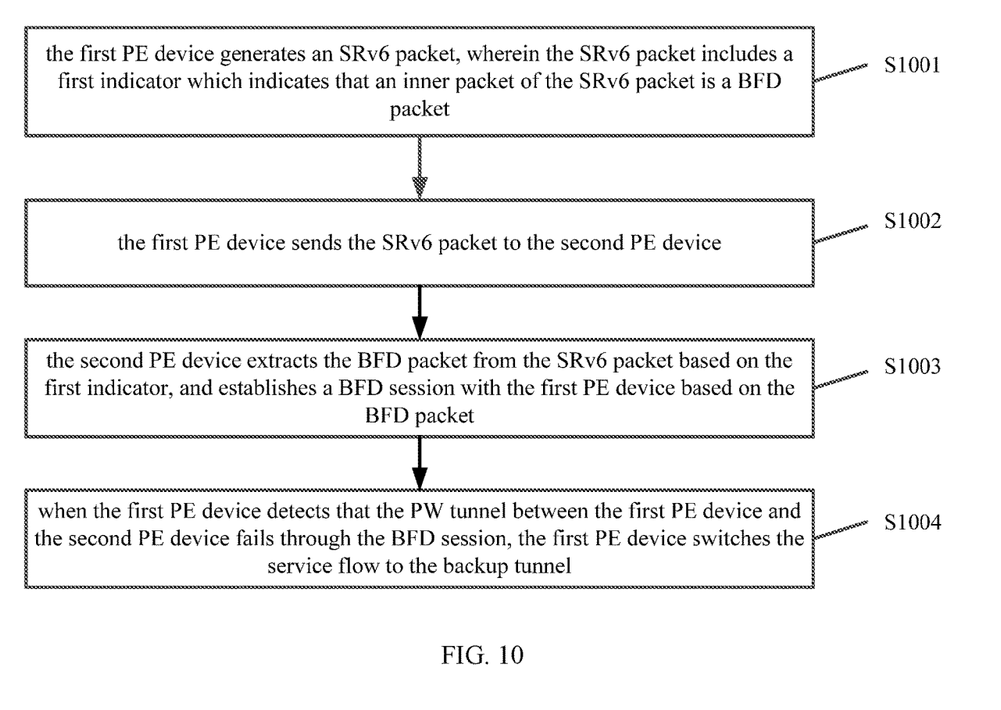
FIG. 10 is another flow chart of a method for failure detection according to an example of the present disclosure.

Based on the scenario 3, the example of the present disclosure provides a method for failure detection. As shown in FIG. 10, the method includes the following blocks.

At block S1001, the first PE device generates an SRv6 packet; wherein, the SRv6 packet includes a first indicator, which indicates that an inner packet of the SRv6 packet is a BFD packet.

In the scenario 3, the first PE device is not a splice device, and the configuration information of the first PE device includes bfd enable control-word. The first PE device may determine that a BFD function needs to be enabled based on the configuration information, and then generate the SRv6 packet.

At block S1002, the first PE device sends the SRv6 packet to the second PE device.

At block S1003, the second PE device extracts the BFD packet from the SRv6 packet based on the first indicator, and establishes a BFD session with the first PE device based on the BFD packet.

At block S1004, when the first PE device detects that the PW tunnel between the first PE device and the second PE device fails through the BFD session, the first PE device switches the service flow to a backup tunnel.

The backup tunnel for the PW tunnel between the first PE device and the second PE device is a backup tunnel between the third PE device and the fourth PE device.

In the method for failure detection provided by the example of the present disclosure for devices in the SRv6 network, by encapsulating the BFD packet and the first indicator in the SRv6 packet, the second PE device may establishes the BFD session between the first PE device and the second PE device through the BFD packet in the SRv6 packet. In this way, the failure detection can be performed between the devices in the SRv6 domain through BFD, thereby improving the detection efficiency. As such, the service flow can be switched in time, and the transmission delay of the service flow is reduced.

In another example of the present disclosure, based on the above scenarios 1 to 3, the packet encapsulated in the SRv6 packet transmitted between the first PE device and the second PE device may also be MPLS Operation Administration and Maintenance (OAM) packets other than the BFD packet, so as to enable PE devices in the SRv6 network to process the MPLS OAM packets. For example, the MPLS OAM packet may also be a ping command.

Figure 11:
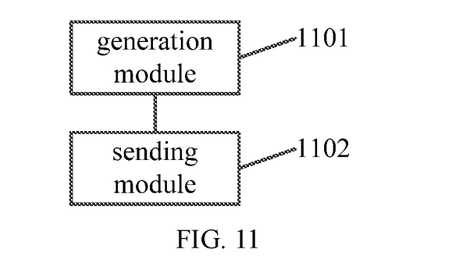
FIG. 11 is a schematic structural diagram of an apparatus for failure detection according to an example of the present disclosure.

Based on the same technical concept, an example of the present disclosure provides an apparatus for failure detection. The apparatus is applied to a first PE device in an EVPN. The first PE device is connected to a second PE device through an SRv6 PW tunnel. As shown in FIG. 11, the apparatus includes:

a generation module 1101, to generate an SRv6 packet; wherein, the SRv6 packet includes a first indicator, which indicates that an inner packet of the SRv6 packet is a bidirectional forwarding detection (BFD) packet;

a sending module 1102, to send the SRv6 packet to the second PE device, so that when the second PE device is a tail node, the second PE device establishes a BFD session with a head node based on the BFD packet, and when the head node detects that the PW tunnel between the head node and the tail node fails through the BFD session, the head node switches a service flow to a backup tunnel; or, when the second PE device is a splice device, the second PE device transparently transmits the BFD packet to the tail node, so that the BFD session is established between the head node and the tail node, and when the head node detects that the PW tunnel between the head node and the tail node fails through the BFD session, the head node switches the service flow to the backup tunnel;

wherein, each of the head node and the tail node is a node connected to a custom edge (CE) device.

In an example, the head node is a first multi-protocol label switching (MPLS) device, and the first PE device is connected to the first MPLS device through a first MPLS pseudo wire (PW) tunnel.

The apparatus further includes:

a receiving module, to receive a first MPLS packet sent by the first MPLS device before the generation module 1101 generates the SRv6 packet;

a decapsulation module, to decapsulate the first MPLS packet, and read a PW associated control channel (ACH) field in the first MPLS packet; and an extracting module, to extract the BFD packet following the PW ACH field if a value of the PW ACH field is a BFD control word; wherein, the BFD control word indicates that an inner packet included in the first MPLS packet is the BFD packet;

the generation module 1101 is further to encapsulate the BFD packet to obtain the SRv6 packet; wherein, a value of an inner routing header field of the SRv6 packet is the first indicator.

In an example, the apparatus further includes:

a determination module, to determine whether configuration information of the first PE device includes splice configuration information, which indicates that the first PE device is to implement intercommunication between an MPLS network and an SRv6 network; and if the configuration information of the first PE device includes the splice configuration information, trigger the generation module to encapsulate the BFD packet to obtain the SRv6 packet.

Figure 12:
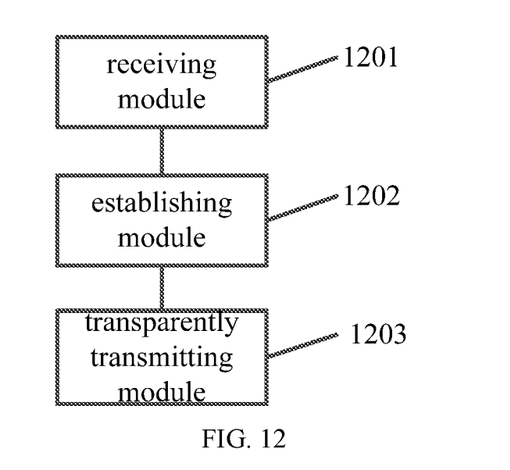
FIG. 12 is another schematic structural diagram of an apparatus for failure detection according to an example of the present disclosure.

Based on the same technical concept, an example of the present disclosure further provides an apparatus for failure detection. The apparatus is applied to a second PE device in an EVPN. The second PE device is connected to a first PE device through a first SRv6 PW tunnel. As shown in FIG. 12, the apparatus includes:

a receiving module 1201, to receive an SRv6 packet sent by the first PE device; wherein, the SRv6 packet includes a first indicator, which indicates that an inner packet of the SRv6 packet is a BFD packet;

an establishing module 1202, to establish a BFD session between the second PE device and a head node based on the BFD packet when the second PE device is a tail node, so that when the head node detects that the PW tunnel between the head node and the tail node fails through the BFD session, the head node switches a service flow to a backup tunnel;
a transparently transmitting module 1203, to transparently transmit the BFD packet to the tail node when the second PE device is a splice device, so that the BFD session is established between the head node and the tail node, and when the head node detects that the PW tunnel between the head node and the tail node fails through the BFD session, the head node switches the service flow to the backup tunnel;
wherein, each of the head node and the tail node is a node connected to a custom edge (CE) device.

In an example, the tail node is a second multi-protocol label switching (MPLS) device, and the second MPLS device is connected to the second PE device.

The apparatus further includes:
a reading module, to read an inner routing header field of the SRv6 packet;
an extracting module, to extract the BFD packet from the SRv6 packet when a value of the inner routing header field is the first indicator; and
an encapsulation module, to encapsulate the BFD packet to obtain a second MPLS packet; wherein, a value of a PW associated control channel (ACH) field of the second MPLS packet is a BFD control word;
the transparently transmitting module 1203 is further to send the second MPLS packet to the second MPLS device.

In an example, the apparatus further includes a determination module to:
determine whether configuration information of the second PE device includes splice configuration information, which indicates that the second PE device is to implement intercommunication between an SRv6 network and an MPLS network;
if the configuration information of the second PE device includes the splice configuration information, determine that the second PE device is the splice device;
if the configuration information of the second PE device does not include the splice configuration information, determine that the second PE device is the tail node.

Figure 13:
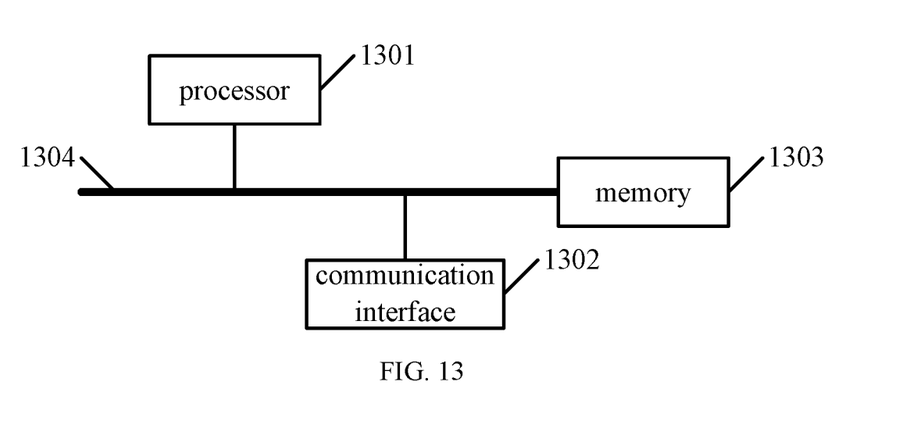
FIG. 13 is a schematic structural diagram of a PE device according to an example of the present disclosure.

An example of the present disclosure further provides a PE device. The PE device may be the first PE device or the second PE device in the above examples. As shown in FIG. 13, the PE device includes a processor 1301, a communication interface 1302, a memory 1303 and a communication bus 1304. The processor 1301, the communication interface 1302 and the memory 1303 communicate with each other through the communication bus 1304.

The memory 1303 is to store a computer program.

The processor 1301 is to, when executing the computer program stored in the memory 1303, perform the method in the examples of the method.

The communication bus in the above PE device may be a Peripheral Component Interconnect (PCI) bus or an Extended Industry Standard Architecture (EISA) bus and the like. This communication bus may include an address bus, a data bus, a control bus, or the like. For ease of representation, only one thick line is shown in the figure, which does not represent that there is only one communication bus or one type of communication bus.

The communication interface is used for communication between the above PE advice and other advices.

The memory may include a Random Access Memory (RAM), or may include a Non-Volatile Memory (NVM), for example at least one disk memory. Optionally, the memory may further be at least one storage apparatus located away from the above processor.

The above processor may be a general-purpose processor, including a Central Processing Unit (CPU), a Network Processor (NP), or the like. The above processor may also be a Digital Signal Processor (DSP), an Application Specific Integrated Circuit (ASIC), a Field-Programmable Gate Array (FPGA) or other programmable logic devices, discrete gates or transistor logic devices, discrete hardware components.

Another example of the present disclosure further provides a computer readable storage medium having stored therein a computer program. The computer program is executed by a processor, so as to cause the processor to carry out any of the above methods for failure detection.

Another example of the present disclosure further provides a computer program product including instructions that, when executed by a computer, cause the computer to perform any method for failure detection in the above examples.

In the above examples, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions according to examples of the present disclosure are generated in whole or in part. The computer may be a general purpose computer, a special purpose computer, a computer network, or other programmable apparatus. The computer instructions may be stored in a computer readable storage medium or transmitted from one computer readable storage medium to another computer readable storage medium. For example, the computer instructions may be transmitted from a website site, computer, server or data center to another website site, computer, server or data center in a wired (e.g., coaxial-cable, fiber, digital subscriber line (DSL)) or wireless (e.g., infrared, wireless, microwave, etc.) manner. The computer readable storage medium may be any available medium that can be accessed by a computer or may be a data storage device, such as a server, data center, or the like, including one or more integrated available mediums. The available mediums may be magnetic medium (e.g., floppy disk, hard disk, magnetic tape), optical medium (e.g., DVD), or semiconductor medium (e.g., solid state disk (SSD)), etc.

It should be noted that the relationship terms used herein, such as "first", "second" and the like are only to distinguish one entity or operation from another entity or operation, but do not necessarily require or imply that there is any actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the examples in the description are described in a correlated manner, and identical or similar parts in various examples can refer to one another. In addition, the description for each example focuses on the differences from other examples. In particular, the example of the apparatus is described briefly, since it is substantially similar to the example of the method, and the related contents can refer to the description of the example of the method.

The above described examples are simply preferable examples of the present disclosure, and are not intended to limit the scope of protection of the present disclosure. Any modifications, equivalent alternatives, improvements, or the like within the spirit and principle of the present disclosure shall be included within the scope of protection of the present disclosure.

What is claimed is:

1. A method for failure detection, wherein, the method is applied to a first service provider edge (PE) device in an Ethernet virtual private network (EVPN), the first PE device is connected to a second PE device through an Internet protocol version 6 segment routing (SRv6) pseudo wire (PW) tunnel, and the method comprises:
   generating an SRv6 packet; wherein, the SRv6 packet comprises a first indicator, which indicates that an inner packet of the SRv6 packet is a bidirectional forwarding detection (BFD) packet;
   sending the SRv6 packet to the second PE device, so that when the second PE device is a tail node, the second PE device establishes a BFD session with a head node based on the BFD packet, and when the head node detects that the PW tunnel between the head node and the tail node fails through the BFD session, the head node switches a service flow to a backup tunnel; or, when the second PE device is a splice device, the second PE device transparently transmits the BFD packet to the tail node, so that the BFD session is established between the head node and the tail node, and when the head node detects that the PW tunnel between the head node and the tail node fails through the BFD session, the head node switches the service flow to the backup tunnel; and
   wherein, each of the head node and the tail node is a node connected to a custom edge (CE) device,
   wherein, the head node is a first multi-protocol label switching (MPLS) device, and the first PE device is connected to the first MPLS device through a first MPLS pseudo wire (PW) tunnel;
   before generating the SRv6 packet, the method comprises:
   receiving a first MPLS packet sent by the first MPLS device;
   decapsulating the first MPLS packet, and reading a PW associated control channel (ACH) field in the first MPLS packet;
   if a value of the PW ACH field is a BFD control word, extracting the BFD packet following the PW ACH field; wherein, the BFD control word indicates that an inner packet comprised in the first MPLS packet is the BFD packet;
   wherein generating the SRv6 packet comprises:
   encapsulating the BFD packet to obtain the SRv6 packet; wherein, a value of an inner routing header field of the SRv6 packet is the first indicator.

2. The method of claim 1, wherein, after extracting the BFD packet following the PW ACH field, the method further comprises:
   determining whether configuration information of the first PE device comprises splice configuration information, which indicates that the first PE device is to implement intercommunication between an MPLS network and an SRv6 network;
   if the configuration information of the first PE device comprises the splice configuration information, performing the operation of encapsulating the BFD packet to obtain the SRv6 packet.

3. A method for failure detection, wherein, the method is applied to a second service provider edge (PE) device in an Ethernet virtual private network (EVPN), the second PE device is connected to a first PE device through a first Internet protocol version 6 segment routing (SRv6) pseudo wire (PW) tunnel, and the method comprises:
   receiving an SRv6 packet sent by the first PE device; wherein, the SRv6 packet comprises a first indicator, which indicates that an inner packet of the SRv6 packet is a bidirectional forwarding detection (BFD) packet;
   establishing a BFD session with a head node based on the BFD packet when the second PE device is a tail node, so that when the head node detects that the PW tunnel between the head node and the tail node fails through the BFD session, the head node switches a service flow to a backup tunnel;
   transparently transmitting the BFD packet to the tail node when the second PE device is a splice device, so that the BFD session is established between the head node and the tail node, and when the head node detects that the PW tunnel between the head node and the tail node fails through the BFD session, the head node switches the service flow to the backup tunnel;
   wherein, each of the head node and the tail node is a node connected to a custom edge (CE) device,
   wherein, the tail node is a second multi-protocol label switching (MPLS) device, and the second MPLS device is connected to the second PE device;
   before transparently transmitting the BFD packet to the tail node when the second PE device is not the tail node, the method further comprises:
   reading an inner routing header field of the SRv6 packet;
   if a value of the inner routing header field is the first indicator, extracting the BFD packet from the SRv6 packet;
   encapsulating the BFD packet to obtain a second MPLS packet; wherein, a value of a PW associated control channel (ACH) field of the second MPLS packet is a BFD control word;
   wherein transparently transmitting the BFD packet to the tail node comprises:
   sending the second MPLS packet to the second MPLS device.

4. The method of claim 3, wherein, after receiving the SRv6 packet sent by the first PE device, the method further comprises:
   determining whether configuration information of the second PE device comprises splice configuration information, which indicates that the second PE device is to implement intercommunication between an SRv6 network and an MPLS network;
   if the configuration information of the second PE device comprises the splice configuration information, determining that the second PE device is the splice device; and
   if the configuration information of the second PE device does not comprise the splice configuration information, determining that the second PE device is the tail node.

5. A PE device, which is a first service provider edge (PE) device in an Ethernet virtual private network (EVPN) and is connected to a second PE device through an Internet protocol version 6 segment routing (SRv6) pseudo wire (PW) tunnel, and comprises a processor, a communication interface, a memory and a communication bus; wherein, the processor, the communication interface and the memory communicate with each other through the communication bus;

the memory is to store a computer program;
the processor is to, when executing the computer program stored in the memory, perform operations of:
generating an SRv6 packet; wherein, the SRv6 packet comprises a first indicator, which indicates that an inner packet of the SRv6 packet is a bidirectional forwarding detection (BFD) packet;
sending the SRv6 packet to the second PE device, so that when the second PE device is a tail node, the second PE device establishes a BFD session with a head node based on the BFD packet, and when the head node detects that the PW tunnel between the head node and the tail node fails through the BFD session, the head node switches a service flow to a backup tunnel; or, when the second PE device is a splice device, the second PE device transparently transmits the BFD packet to the tail node, so that the BFD session is established between the head node and the tail node, and when the head node detects that the PW tunnel between the head node and the tail node fails through the BFD session, the head node switches the service flow to the backup tunnel; and
wherein, each of the head node and the tail node is a node connected to a custom edge (CE) device,
wherein, the head node is a first multi-protocol label switching (MPLS) device, and the first PE device is connected to the first MPLS device through a first MPLS pseudo wire (PW) tunnel;
before generating the SRv6 packet, the processor is further caused to perform operations of:
receiving a first MPLS packet sent by the first MPLS device;
decapsulating the first MPLS packet, and reading a PW associated control channel (ACH) field in the first MPLS packet;
if a value of the PW ACH field is a BFD control word, extracting the BFD packet following the PW ACH field; wherein, the BFD control word indicates that an inner packet comprised in the first MPLS packet is the BFD packet;
wherein generating the SRv6 packet comprises:
encapsulating the BFD packet to obtain the SRv6 packet; wherein, a value of an inner routing header field of the SRv6 packet is the first indicator.

6. A PE device, which is a second service provider edge (PE) device in an Ethernet virtual private network (EVPN) and is connected to a first PE device through a first Internet protocol version 6 segment routing (SRv6) pseudo wire (PW) tunnel, and comprises a processor, a communication interface, a memory and a communication bus; wherein, the processor, the communication interface and the memory communicate with each other through the communication bus;

the memory is to store a computer program;
the processor is to, when executing the computer program stored in the memory, perform operations of:
receiving an SRv6 packet sent by the first PE device; wherein, the SRv6 packet comprises a first indicator, which indicates that an inner packet of the SRv6 packet is a bidirectional forwarding detection (BFD) packet;
establishing a BFD session with a head node based on the BFD packet when the second PE device is a tail node, so that when the head node detects that the PW tunnel between the head node and the tail node fails through the BFD session, the head node switches a service flow to a backup tunnel;
transparently transmitting the BFD packet to the tail node when the second PE device is a splice device, so that the BFD session is established between the head node and the tail node, and when the head node detects that the PW tunnel between the head node and the tail node fails through the BFD session, the head node switches the service flow to the backup tunnel;
wherein, each of the head node and the tail node is a node connected to a custom edge (CE) device,
wherein, the tail node is a second multi-protocol label switching (MPLS) device, and the second MPLS device is connected to the second PE device;
before transparently transmitting the BFD packet to the tail node when the second PE device is not the tail node, the processor is further caused to perform operations of:
reading an inner routing header field of the SRv6 packet;
if a value of the inner routing header field is the first indicator, extracting the BFD packet from the SRv6 packet;
encapsulating the BFD packet to obtain a second MPLS packet; wherein, a value of a PW associated control channel (ACH) field of the second MPLS packet is a BFD control word;
wherein transparently transmitting the BFD packet to the tail node comprises:
sending the second MPLS packet to the second MPLS device.

7. The PE device of claim 5, wherein, after extracting the BFD packet following the PW ACH field, the processor is further caused to perform operations of:
determining whether configuration information of the first PE device comprises splice configuration information, which indicates that the first PE device is to implement intercommunication between an MPLS network and an SRv6 network;
if the configuration information of the first PE device comprises the splice configuration information, performing the operation of encapsulating the BFD packet to obtain the SRv6 packet.

8. The PE device of claim 6, wherein, after receiving the SRv6 packet sent by the first PE device, the processor is further caused to perform operations of:
determining whether configuration information of the second PE device comprises splice configuration information, which indicates that the second PE device is to implement intercommunication between an SRv6 network and an MPLS network;
if the configuration information of the second PE device comprises the splice configuration information, determining that the second PE device is the splice device; and
if the configuration information of the second PE device does not comprise the splice configuration information, determining that the second PE device is the tail node.

* * * * *